May 28, 1968    J. M. TUMS    3,385,945
PREWIRED AND PRESEALED DEVICES FOR USE IN HAZARDOUS AREAS
Filed Dec. 9, 1966    2 Sheets-Sheet 1

INVENTOR.
John M. Tums
BY    ATTORNEYS

May 28, 1968 J. M. TUMS 3,385,945
PREWIRED AND PRESEALED DEVICES FOR USE IN HAZARDOUS AREAS
Filed Dec. 9, 1966 2 Sheets-Sheet 2

INVENTOR.
John M. Tums
BY Bill Sherman Meroni Gross & Simpson
ATTORNEYS 3,385,945
PREWIRED AND PRESEALED DEVICES FOR
USE IN HAZARDOUS AREAS
John M. Tums, Oak Park, Ill., assignor to The Pyle
National Company, Chicago, Ill., a corporation of
New Jersey
Filed Dec. 9, 1966, Ser. No. 600,457
2 Claims. (Cl. 200—168)

ABSTRACT OF THE DISCLOSURE

A prewired and presealed device for use in hazardous areas having upper and lower housing portions joined together at low tolerance explosion-proof flanges and having a switch cavity formed therein with a switch means deployed within the cavity and having lead wires extending through explosion-proof openings in the housing and employing a rocker-arm type switch actuator to allow explosion-proof operation of the switch means.

BACKGROUND OF THE INVENTION

Field of the invention

The field of art to which this invention pertains is a prewired and presealed device for use in hazardous areas having explosion-proof joints for removably supporting a switch means and having a switch actuator and lead contact wires connected thereto in such a manner as to produce an explosion-proof assembly to guard against ignition of explosive environmental gases upon actuation of the switch means.

Description of the prior art

In explosive-type environments, such as hydrogen and other gases, it is necessary to enclose electrical switching devices which can generate a spark or otherwise develop a high temperature region which will ignite the gases in the environment. The enclosure must have sufficient strength and flame paths at joints to contain the explosion within the enclosure. As an additional requirement, proper installation of an enclosure for a switching device requires that the arc containing chamber be sealed from the remainder of the electrical conduit and outlet boxes, the method previously used to accomplish such sealing has been to provide a seal at the joint between the conduit and the enclosure. This requires a separate special sealing fitting. It is apparent that it would be desirable to provide a single prewired and presealed switch which would be portable and which would not require sealing or encapsulating at the area of use and which could be readily connected to electrical equipment in a safe and reliable manner.

SUMMARY

An important factor of this invention is to provide a prewired and presealed device for use in hazardous areas wherein the device is completely encased in an explosion-proof housing, wherein the lead wires to the device are permanently and securely sealed internally of the device and wherein the actuating means for the device is sealably and permanently mounted to the housing thereof, and no additional seals are required.

Another feature of the invention is to provide a presealed and prewired switching mechanism having an upper and lower housing section wherein the upper and lower housing are sealably engaged at low tolerance metal joints and wherein the lead wires and actuator mechanisms are permanently and sealably within the walls of the switch housing.

An object of this invention is to provide a prewired and presealed device as described above wherein the housing of the device has openings for permitting lead wires to extend from the switch to points outside the housing and wherein tubular portions are formed integrally with the housing to allow an elongated region about the lead wires.

Other and further objects of this invention will be apparent to those skilled in this art from the following detailed description and the annexed sheets of drawings which show several embodiments of the invention.

DESCRIPTION OF THE PREFERRED EMBODIMENT

Figure 1:
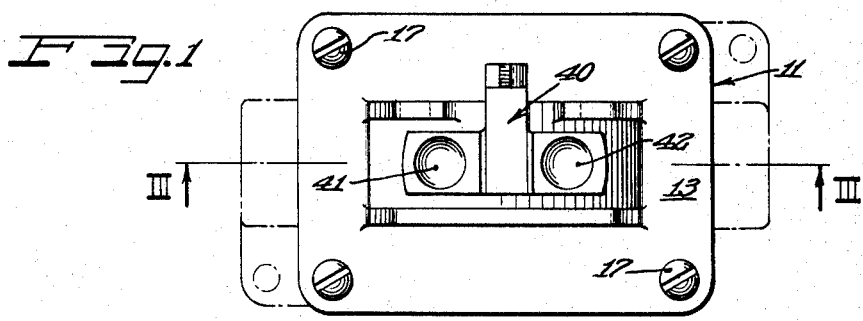
FIGURE 1 is a top elevational view of a prewired and presealed device according to this invention.
Figure 2:
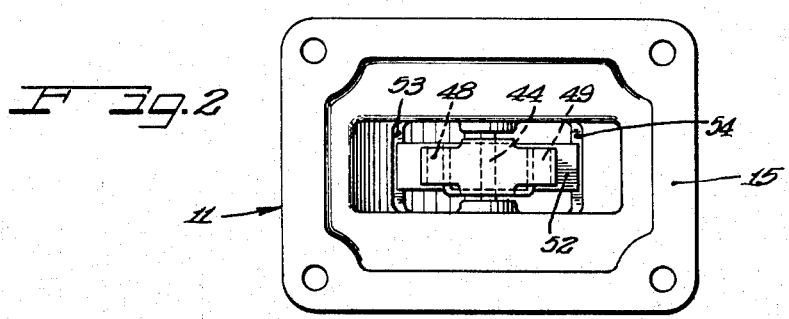
FIGURE 2 is an elevational view looking into the interior of the upper housing portion of the presealed, prewired device of FIGURE 1.

The prewired and presealed device of this invention has a housing 10 having an upper housing portion 11 and a lower housing portion 12. The upper and lower housing portions 11 and 12 have flanges 13 and 14 formed about the periphery thereof and which are joined together at low tolerance surfaces 15 and 16 to form an explosion-proof seal therebetween. The two housing portions are assembled by means of a plurality of fasteners 17. An additional enclosure 12a has a flange 14a which forms a low tolerance joint with flange 14 at points 14b.

The upper and lower housing portions 11 and 12 together define a switch cavity 18 which holds a switch assembly 19 and which is completely sealed from the external environment of the housing 10 to provide an explosion-proof assembly.

The switch 19 comprises a switch casing 20 having an attachment plate 21 fastened to the surface thereof by a number of fasteners 22. The fastener plate is in turn secured to the lower housing portion 12 at recessed wall portions 23 and 24 by a series of fasteners 25. A number of contacts 26 and 27 are provided on the casing 20 to receive lead wires for connecting external equipment to the switch. Lead wires 28 and 29 are connected to similar type contacts not shown in the drawings.

The lead wires 28 and 29 extend through openings 30 and 31 respectively formed within the lower housing portion 12 and having a diameter substantially equal to the diameter of the wires. Tubular portions 32 and 33 extend from the lower surface of the housing portion 12 and effectively form a channel about the lead wires to provide a means for sealing the wires to close off the interior of the housing 10. For this purpose, a sealing material 34 is disposed within the tubular portions 32 and 33 to prevent the passage of environmental gases and the like along the length of wire from the outside to the inside of the housing 10.

Figure 4:
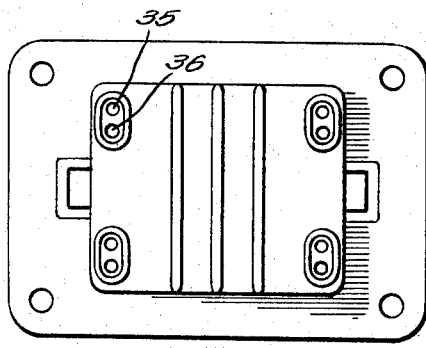
FIGURE 4 is a bottom elevational view of the device of FIGURE 1.
Figure 5:
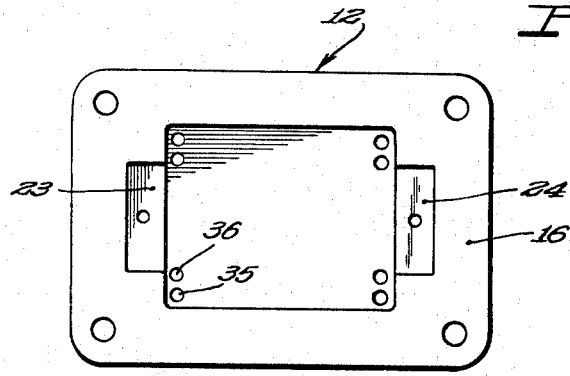
FIGURE 5 is an elevational view looking into the interior of the lower housing portion of the device of FIGURE 1.
Figure 6:
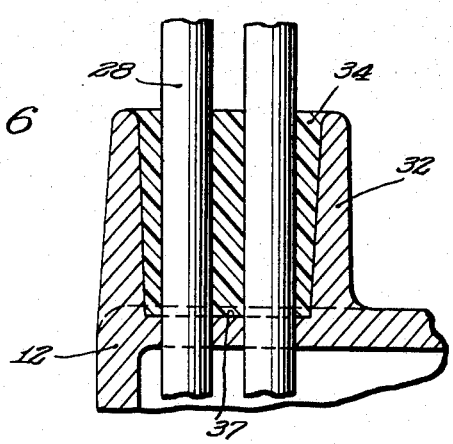
FIGURE 6 is an enlarged sectional view taken through one of the tubular portions of the explosion-proof ousing and showing the positioning of lead wires therein and the sealing of those wires to prevent the communication of gases from the interior to the exterior of the device.

As shown in FIGURES 4 and 6, each of the tubular portions 32 and 33, for instance, may hold a plurality of wires. However, each wire is threaded through a separate bore in the lower housing portion such as the bores 35 and 36. In this way, a substantial portion of the lower surface of the housing portion 12 remains, such as the surface portion 37 to support the sealing materials within the tubular members. Essentially, the surface 37 provides a base for holding the sealing material, resin, or the like within the associated tubular portion and about the associated lead wires.

The switch 19 is operated by two plunger-type actuators 38 and 39 which extend into the casing 20 to make or break contacts therein when depressed or released. Means must be provided to operate the actuators 38 and 39 from points externally of the housing while maintaining the switch cavity 18 in an explosion-proof condition.

Such an actuating means is provided in the form of a rocker arm 40 having lever portions 41 and 42 and having a stem 43 which, in turn, is connected to a shaft or pin 44. The shaft or pin 44 is rotatably mounted in a wall 45 of the upper housing portion 11. It is apparent that by converting the translation-type motion required to operate the plungers 38 and 39 into a rotary motion, that an explosion proof joint can be provided about the shaft 44.

An internal rocker arm 46 is keyed as at 47 to the shaft 44 and has lever portions 48 and 49 which extend outwardly therefrom in opposite directions and which have plane surfaces 50 and 51 for contacting the plunger-type actuators 38 and 39.

In order to assure that both actuators 38 and 39 are maintained in a nondepressed state, normally, a leaf spring 52 is provided. In particular, the leaf spring 52 is engaged within recessed portions 53 and 54 of the upper housing 11 and is also engaged against spring seats 55 and 56 which are formed integrally with the stem 43 and which contact the upper surface of the spring 52. When the shaft 44 is rotated in one direction, one of the spring seats bears against the leaf spring, and the leaf spring tends to return the shaft to a normal or undeflected position.

Figure 3:
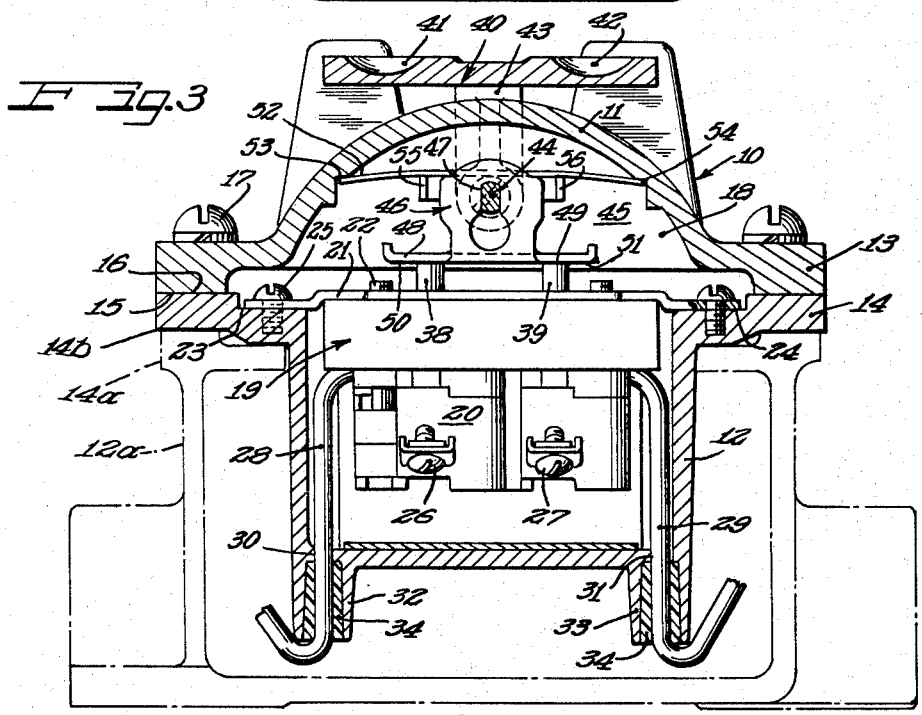
FIGURE 3 is a sectional view taken along the lines III—III of FIGURE 1.

In operation, the lever portions 41 and 42 of the rocker arm 40 may be depressed either to the left or to the right in FIGURE 3 to rotate the rocker arm assembly 46 and to depress one of the plunger-type actuators 38 and 39. By depressing one of the plungers, a signal may be given internally of the casing 20 to turn on or turn off a system depending upon which plunger is actuated. The arc or high temperature regions created adjacent the contacts of the switch 19 are maintained in the closed environment provided by the sealed joints at the surfaces 15 and 16, by the sealed tubular portions, such as the portions 32 and 33 of the lower housing 12 and by the explosion-proof joint of the rotatably mounted shaft 44.

It will be apparent that various modifications and combinations of the features of this invention may be accomplished by those skilled in the art, but I desire to claim all such modifications and combinations as properly come within the spirit and scope of my invention.

I claim as my invention:

1. A prewired and presealed switch for use in hazardous areas comprising:
   an explosion proof housing having upper and lower housing portions and an internal switch cavity formed by said housing portions,
   said upper and lower housing portions having explosion proof low tolerance flanges and being joined at said flanges and forming said internal switch cavity thereby,
   an electrical switch disposed within said cavity and having at least one lead wire operably connected to said switch,
   said lower housing portion having at least one opening formed therein and having a substantially tubular member formed integrally therewith around said opening,
   said tubular portion having a diameter greater than the diameter of said opening,
   at least one of said lead wires extending through said opening and through said tubular portion to the outside of said housing,
   sealing medium disposed in said tubular portion about said lead wire and completely closing said opening,
   said upper housing portion having an actuator opening formed therein, and
   actuator means disposed external of said housing and extending through said actuator opening and together with one another forming an explosion proof joint and engageably connected to said switch for actuating the same.

2. A prewired and presealed device in accordance with claim 1 wherein a plurality of lead wires are fed through said tubular member and wherein a separate opening is formed in said housing for each of said lead wires, said opening having a diameter substantially equal to the diameter of the lead wires, and wherein said sealing medium is packed into said tubular portion about said lead wires and against the wall of said housing forming said openings.

References Cited

UNITED STATES PATENTS

| | | | |
|---|---|---|---|
| 1,869,646 | 8/1932 | Anderson | 200—168 |
| 2,240,922 | 5/1941 | Bissell | 200—168 |
| 2,321,508 | 6/1943 | Olley et al. | 200—168 |
| 2,666,119 | 1/1954 | Becker | 200—168 |
| 2,702,845 | 2/1955 | De Smidt | 200—168 |

ROBERT K. SCHAEFER, *Primary Examiner.*

H. O. JONES. *Assistant Examiner.*